(12) United States Patent
Dockery

(10) Patent No.: US 12,375,324 B2
(45) Date of Patent: Jul. 29, 2025

(54) ELECTRICAL CURRENT BALANCING SYSTEM

(71) Applicant: Gregory A. Dockery, Cedar Park, TX (US)

(72) Inventor: Gregory A. Dockery, Cedar Park, TX (US)

( * ) Notice: Subject to any disclaimer, the term of this patent is extended or adjusted under 35 U.S.C. 154(b) by 90 days.

(21) Appl. No.: 18/505,679

(22) Filed: Nov. 9, 2023

(65) Prior Publication Data

US 2025/0158853 A1     May 15, 2025

(51) Int. Cl.
*H04L 25/02*     (2006.01)

(52) U.S. Cl.
CPC ...... *H04L 25/0284* (2013.01); *H04L 25/0274* (2013.01)

(58) Field of Classification Search
CPC ............. H04L 25/0282; H04L 25/0286; H04L 25/0284; H04L 25/0288; H04L 25/0276; H04L 25/0272; H04L 25/0266; H04L 25/027; H04L 25/0268; H04L 25/0296; H04L 25/03878; H04L 25/03885; H04L 25/08; H04L 25/085
See application file for complete search history.

(56) References Cited

U.S. PATENT DOCUMENTS

| | | | |
|---|---|---|---|
| 4,419,665 A * | 12/1983 | Gurr | H02J 13/00034 700/286 |
| 6,122,183 A | 9/2000 | He | |
| 7,834,643 B2 | 11/2010 | Yohanan | |
| 8,928,398 B2 | 1/2015 | Lee | |
| 9,124,169 B2 | 9/2015 | Garlow | |
| 9,325,358 B2 | 4/2016 | Cha | |
| 10,637,294 B2 | 4/2020 | Sarwat | |
| 2003/0085761 A1 | 5/2003 | Okubo | |
| 2011/0148202 A1* | 6/2011 | Rada | G05F 1/70 307/105 |
| 2011/0182012 A1* | 7/2011 | Hilton | H02G 3/14 361/679.01 |
| 2014/0375239 A1 | 12/2014 | Kim | |
| 2018/0219505 A1 | 8/2018 | Emmet | |
| 2022/0200282 A1* | 6/2022 | Alali | H02J 3/01 |
| 2022/0221499 A1* | 7/2022 | Cho | G01R 19/2513 |

FOREIGN PATENT DOCUMENTS

EP      1276225      12/2017

\* cited by examiner

*Primary Examiner* — Khanh C Tran

(57) ABSTRACT

A system and method for improving electrical efficiency in a system with three-phase electrical current is disclosed. The system includes components used to balance the currents between the phases and components used to tune components to minimize the lag between current and voltage for each of the phases for each of the three phase loads in a system with three phase power supplied and three phase loads.

20 Claims, 4 Drawing Sheets

ELECTRICAL CURRENT BALANCING SYSTEM

BACKGROUND

Technical Field

The present disclosure relates, in general, to electronic control systems, and in particular, without limitation, electrical current balancing systems.

Electrical control systems are known in the art.

U.S. Ser. No. 10/637,294 discloses wireless power electronics and controls.

EP1276225 discloses a motor control apparatus for reducing higher harmonic current.

U.S. Pat. No. 6,122,183 discloses a two-stage, three-phase boost converter with reduced total harmonic distortion.

U.S. Pat. No. 8,928,398 discloses a differential analog signal processing stage with reduced even order harmonic distortion.

U.S. Pat. No. 9,124,169 discloses an autotransformer system reducing total harmonic distortion.

U.S. Pat. No. 7,834,643 discloses Systems And Methods For Reducing Distortion In A Power Source Using An Active Harmonics Filter.

U.S. Pat. No. 9,325,358 discloses a method for reducing second order distortion in harmonic rejection mixer.

US20180219505 discloses a phase balance efficiency system to improve motor efficiency and power quality.

US20140375239 discloses a motor control system and method for environmentally-friendly vehicle.

US 2003/0085761 discloses a distortion reducing circuit.

In an AC current device or electrical system with an inductive load, there is a lag between the phases of voltage and current. This lag is known as the "power factor", with the cosine of the angle being the number used as the power factor. The closer the power factor is to 1, the more efficient the system. Known power factor correction systems include capacitors and or "synchronous motors," also known as synchronous condensers, which are induction motors designed to improve the power factor. These known systems are often expensive and have components, such as the capacitors, wear out or break within a relatively short period of time, within a couple of years.

Therefore, a need exists for a convenient electrical current balancing system with reliable and cost-effective operation.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

SUMMARY

A system and method for improving electrical efficiency in a system with three-phase electrical current is disclosed. The system includes components used to balance the currents between the phases and components used to tune components to minimize the lag between current and voltage for each of the phases for each of the three phase loads in a system with three phase power supplied and three phase loads.

The foregoing summary is illustrative only and is not intended to be in any way limiting. In addition to the illustrative aspects, aspects, and features described above, further aspects, aspects, and features will become apparent by reference to the drawings and the following detailed description.

Other systems, methods, features, and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The disclosure can be better understood with reference to the following drawings and description of an aspect. The elements in the figures are not necessarily to scale, emphasis instead being placed upon illustrating the principles of an aspect of the disclosure. Moreover, in the figures, like referenced numerals designate corresponding parts throughout the different views of the aspect.

DETAILED DESCRIPTION

Figure 1:
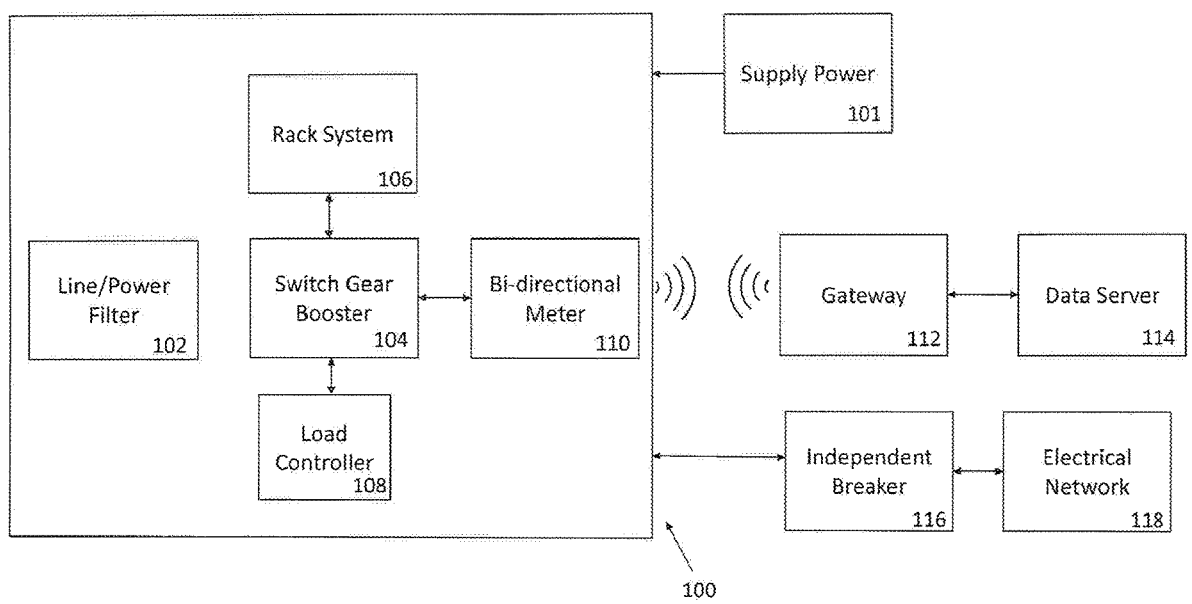
FIG. 1 illustrates an electrical current balancing system according to an aspect of the disclosure.

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

The elements in the Figures interoperate as explained in more detail below. Before setting forth the detail explanation, however, it is noted that all of the discussion below, regardless of the particular implementation being described, is exemplary in nature, rather than limiting. For example, although selected aspects and their features or processes of the implementations are depicted as being stored in memories, all or part of systems and methods consistent with the display systems may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific elements of the architecture of an example aspect will be described, methods, systems, and articles of manufacture consistent with the architecture may include additional or different elements. For example, a processor may be implemented as a microprocessor, microcontroller, application specific integrated circuit (ASIC), discrete logic, or a combination of other type of circuits or logic. Similarly, memories may be DRAM, SRAM, Flash, or any other type of memory. Flags, data, databases, tables, and other data structures may be separately stored and managed, may be incorporated into a single memory or database, may be distributed, or may be logically and physically organized in many different ways. Method and systems described herein may be parts of a single method and system, separate methods and systems, or distributed across several memories and processors.

In the following description, numerous specific details are set forth to clearly describe various specific aspects disclosed herein. One skilled in the art, however, will understand that the presently claimed disclosure may be practiced without all of the specific details discussed below. In other instances, well-known features have not been described so as not to obscure the disclosure. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. In addition, it should be understood that aspects of the disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one aspect, the electronic based aspects of the disclosure may be implemented in software. As such, it should be noted that a plurality of hardware and software-based devices, as well as a plurality of different structural components may be utilized to implement the disclosure. Furthermore, and as described in subsequent paragraphs, the specific logical software configurations illustrated in the drawings are intended to exemplify aspects of the disclosure and that other alternative configurations are possible.

Moreover, acts and steps taken in a process disclosed herein may be different or performed with more or fewer acts or steps taken to execute the process and the acts and steps illustrated herein are not necessarily in a specific order. Acts and process steps taken may be in different order as known to one of skill in the art.

The following briefly describes the aspects of the disclosure. This brief description is not intended as an extensive overview. It is not intended to identify key or critical elements, or to delineate or otherwise narrow the scope. Its purpose is merely to present some concepts in a simplified form as a prelude to the more detailed description that is presented later. It will be understood by one of ordinary skill in the art that the disclosed aspects and implementations presented herein are exemplary aspects of the disclosed electrical current balancing system and method. Other aspects and modifications of the disclosed electrical current balancing system and method may be accomplished without deviating from the scope of the disclosures and its novel inventive concepts.

FIG. 1 shows an electrical current balancing system 100, according to an aspect of the disclosure. The disclosed system includes a line/power filter 102, a switch gear booster 104, a rack system 106, a load controller 108, a bi-directional meter 110, a gateway 112, and a data server 114. The electrical current balancing system 100 is in electrical communication with a power supply source 101. In an aspect, the electrical current balancing system 100 is in electrical communication with one or more independent breakers 116 to an electrical network 118. The components of the electrical current balancing system 100 are described herein.

Line/Power Filter 102: The line/power filter 102 filters and tunes the supply power 101, reducing waste by pushing it into harmonic levels. Any additional waste is directed to the electrical network 118 ground or the main transformer's neutral line using the line/power filter 102.

Switch Gear Booster 104: The switch gear booster 104 serves as a central point for meter data collection and energy usage monitoring. The switch gear booster 104 is in communication with the rack system 106, the load controller 108 and bi-directional meter 110. The switch gear booster 104 may include the rack system 106, the load controller 108 and bi-directional meter 110, as a single unit or as discrete units. The switch gear booster 104 may manage and stabilize voltage and wired or wirelessly control the rack system while increasing power factor levels to 98% and above. This may reduce the need for adding kVAR (i.e. power factor correction banks) on the line.

Rack System 106: The rack system 106 is configured to step up the power factor ratio using the line/power filter 102 once all the electrical network 118 circuits have been installed.

Load Controller 108: Each electrical current balancing system 100 includes a load controller 108 with a radio control device for managing on and off controls for performance and validation purposes.

Gateway 112: The gateway 112, which may be wired or wireless, collects and passes data collected by the bi-directional meter 110 to the data server 114.

Data Server 114: A high-speed data server 114 stores historical data with real-time monitoring of electrical meters (EM), such as the bi-directional meter 110 and voltage (V) tracking to provide proof of energy savings with comprehensive reporting functions.

A proprietary 50 and 60 hertz line filter may be used for narrow band tuning the supply power 101 under load, pushing any additional waste from the 50 or 60 hertz signal into the harmonic levels. The additional waste then gets shunted to earth ground of the electrical network 118 and the main transformers neutral line using the Line/Power Filter 102. In an aspect, electrical current balancing system 100 may service 50 or 60 hertz signals at 600 VAC or less. Higher voltage electrical current balancing systems 100 may also be used for higher voltage applications.

In an aspect, a software application is used to control the line/power filter 102 for reducing up to 51 levels of upstream harmonics by up to 95%. The line/power filter 102 may automatically adjust its filtering capabilities based on the current load and may adjust up or down in order to not add additional load to the electrical network 118.

The switch gear booster 104 may be specifically designed to manage and stabilize voltage while also having the ability to increase power factor levels to 98% and above, reducing the need for additional kVAR rather than like conventional applications which add additional kVAR to the line.

The electrical current balancing system 100 may include a radio control device in communication with the load controller 108, for managing the on and off controls for performance and validation purposes. The load controller 108 may include a 3-phase power quality meter with a wireless data link for collecting real-time data to measure the results in real time, to allow for additional electrical network 118 tuning under load.

The data server 114 is configured to store historical data with real-time EM and V tracking for cost-savings with full scale reporting functions.

Power is delivered from the utility to the facility transformer at high voltages. The facility transformer then transforms the power down to the desired voltages in the facility.

Figure 2:
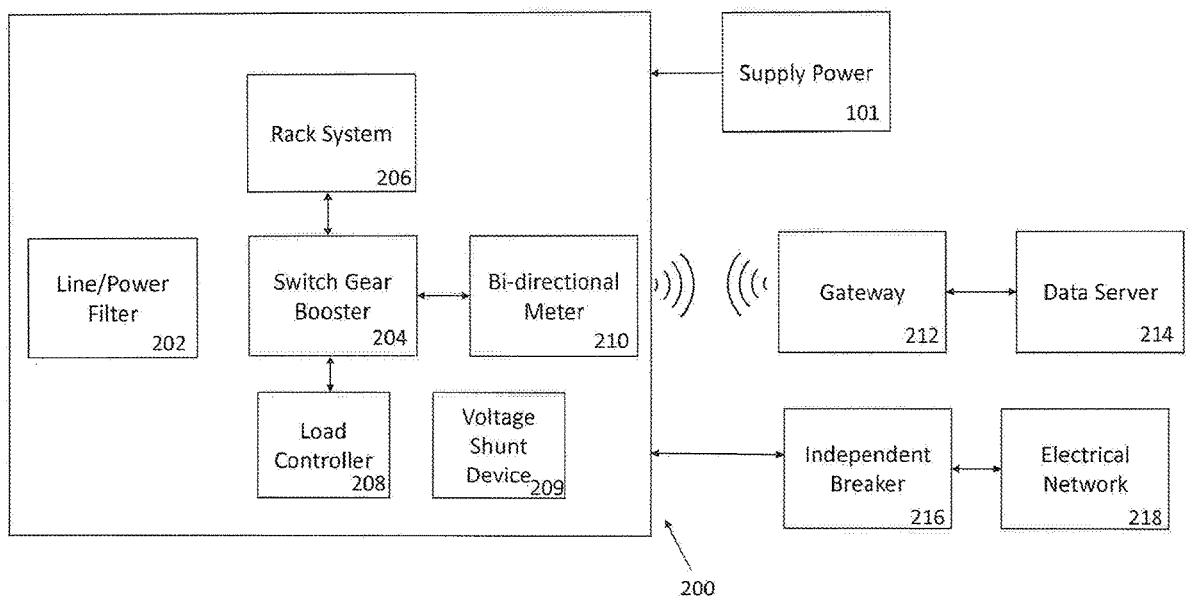
FIG. 2 illustrates an electrical network with an electrical current balancing system according to an aspect of the disclosure.

FIG. 2 shows an electrical current balancing system 200, according to an aspect of the disclosure. The electrical current balancing system 200 may include a line/power filter 202, a switch gear booster 204, a rack system 206, a load controller 208, a voltage shunt device 209, a bi-directional meter 210, a gateway 212, and a data server 214. The electrical current balancing system 200 is in electrical communication with a power supply source 201. In an aspect, the electrical current balancing system 200 is in electrical communication with one or more independent breakers 216 to an electrical network 218.

The elements of the electrical current balancing system 200 function in a similar manner as those described in relation to FIG. 1, though the parameters of the elements of the electrical current balancing network 200 may be adjusted as necessary for different operating grid voltages, electrical network voltages and/or currents.

The voltage shunt device 209 is configured to shunt excess voltage when a grid voltage is too high, such as above a certain voltage threshold. The voltage shunt device 200 may assist in disallowing chillers, and other equipment using DC controls, to not shut down due to excess voltage. In an aspect, the threshold voltage may be greater than about 480V. Other voltage thresholds may be adopted depending on the implementation of the electrical network 218. In an aspect, the voltage shunt device 200 may be a coiled inductor device, configured for the threshold voltage of the electrical grid to shunt excess voltage to a neutral/ground connection for the electrical network 218. In an aspect, the voltage shunt device 200 may be a Zener diode configured to shunt excess voltage of the electrical network 218 to neutral/ground.

Figure 3:
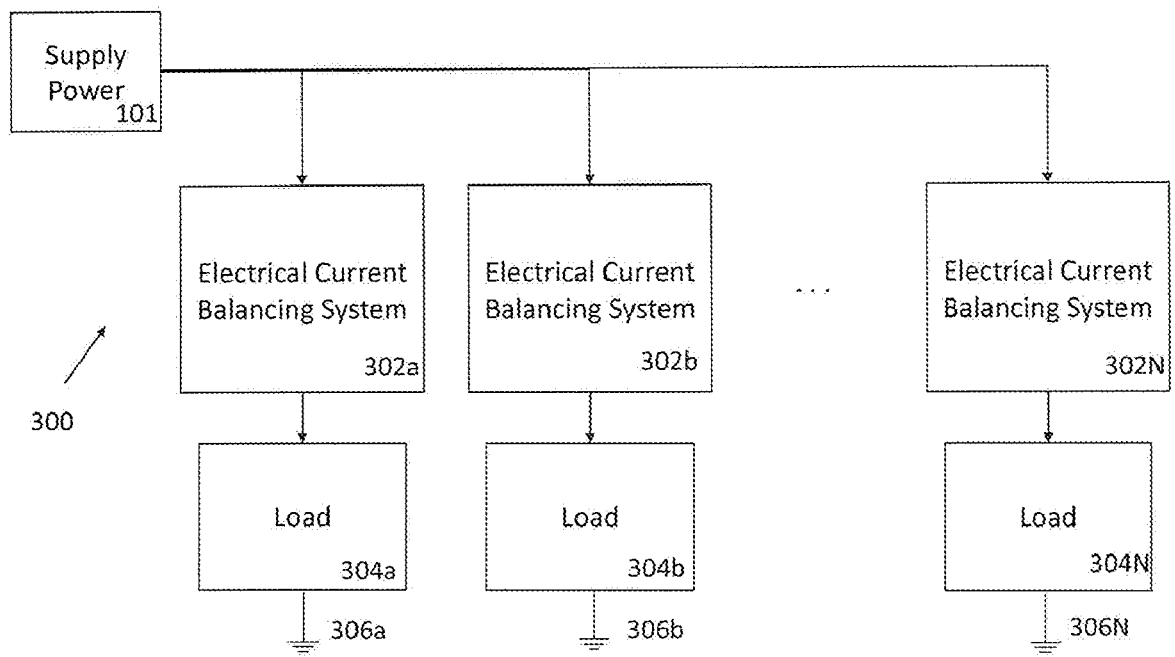
FIG. 3 illustrates another example electrical network with an electrical current balancing system according to an aspect of the disclosure

FIG. 3 shows an example electrical network 300, including an electrical current balancing system 302a-302N, according to an aspect of the disclosure. A supply power 101 as described in relation to FIG. 1 provides power to the electrical network 300. The electrical network 400 may include multiple circuits (1-N) that include one or more electrical current balancing systems 302a-302N, one or more loads 304a-304N and one or more grounds 304a-304N. In an aspect, the one or more electrical current balancing systems 302a-302N may be configured as described in relation to the electrical current balancing system 100. In another aspect of the disclosure, the one or more electrical current balancing systems 302a-302N may be configured differently based on different supply power levels, different supply power voltages or other specifications required by the electrical network 300 as known to one of skill in the art. Examples of the one or more loads 304a-304N include, but are not limited to AC circuit loads such as production equipment, water pumps, injection molding equipment, refrigeration equipment, ovens, conveyor systems, chillers and other AC circuit loads as known to one of skill in the art. Other examples of the one or more loads 304a-304N include, but are not limited to DC circuit loads such as reactors or other DC circuit load examples. Yet other examples of the one or more loads 304a-304N include, but are not limited to inductive circuits such as HVAC units and equipment.

Figure 4:
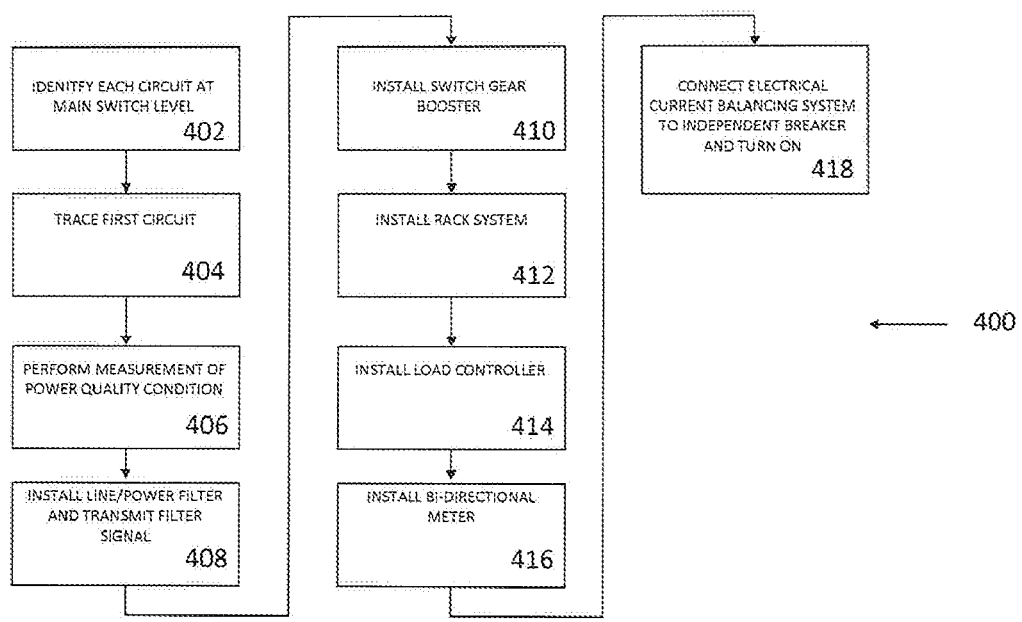
FIG. 4 illustrates example acts taken in a process to configure an electrical current balancing system in an electrical network according to an aspect of the disclosure.

FIG. 4 illustrates a flowchart 400 for acts taken in an exemplary method to configure an electrical network 118 with an electrical current balancing system 100, 200. For the client-side demand of the electrical network 118, power is delivered from a transformer to a main electrical switch gear.

At act 402, each circuit at the main switch gear level will be identified.

At act 404, once identified, a first circuit is traced to enable installation of an electrical current balancing system 100, 200.

At act 406, for the first circuit, a measurement of the power quality condition of that first circuit will be performed while also identifying the type of AC or DC control equipment loads that comprise this first circuit. AC loads are loads of 50 or 60 hertz and DC load equipment means any VFD, Inverters or any other DC controlled equipment that produces harmonics at any of the odd level.

At act 408, once the installation of a line/power filter 102, 202 is completed at the end of the first circuit, an AC or DC filter signal is transmitted upstream for conditioning these loads to allow a cleaner delivery of power at the equipment level on the circuit. The filter signal will be sent upstream to the main switch gear and is measurable. The neutral side of the transformer will also see the conditioned signal to allow for a better return and cleaner cycling of energy in the facility.

Each additional circuit will be installed in the same manner, and once installed, each additional circuit will send a filter signal upstream to the main switchgear.

In an aspect of the disclosure, all of the main circuits at a switch gear will serve as upstream feeder ports for proper line conditioning and results in current balancing for each circuit.

In an aspect, the disclosed electrical current balancing system 100, 200 is installed onto its own independent breaker 116, 118.

At act 410, switch gear booster 104 installation begins. The switch gear booster 104 installation at act 410 also serves as the central point for the facility's overall energy usage and meter data collection in real time.

At act 410, the switch gear booster 104, 204 is installed nearest the main breaker for the switch gear.

At act 412, a rack system 106, 206 is installed, where the rack system 106, 206 is configured to stabilize the main voltage as well as dialing up the facility power factor to its highest level for optimum efficiency.

At act 414, a load controller 108, 208 is installed for wireless on and off control and testing purposes.

At act 416, a calibrated bi-directional meter 110, 210 is installed for collecting the power quality data.

At act 418, when the electrical current balancing system 100, 200 is connected, it is turned on using its own independent breaker 116, 216. Once turned on, the electrical current balancing system 100, 200 will begin communicating and transferring data to the gateway 112, 212 and then to the server 114, 116.

The results from previous test installations that can be expected in a complete electrical network 118, 218 installation, while also understanding that the results from each facility will vary plus or minus due to the power quality condition of the particular electrical network 118, 218.

In an aspect, all main circuits at the switch gear serve as upstream feeder ports for proper line conditioning and current balancing. All line/power filters 102, 202 are designed to send filter signals upstream for narrow-band tuning while also controlling the ripple effects that randomly occur continuously while loads are being drawn from all electrical circuits within the electrical network 118, 218.

The electrical current balancing system 100, 200 also includes an adjustable harmonic filter, which is used to reduce the "noise" caused by running the electrical power through loads which include impedance. By reducing the noise induced by electrical impedance, these filters improve overall electrical efficiency, because they bring the current and voltage back into phase for the individual component and prevent the system as a whole from setting up interference between components.

This constitutes industrial scale technology to reduce the resistance levels (impedance) of any 3-phase electric power source and any 3-phase electric power load while tuning the components, which are run on the standard 60-hertz frequency for electricity, to substantially reduce harmonic distortion in any facility. The line impedance conditions are sampled and evaluated at a rate of 20,000 times a second.

This technology and methodology for improving the resistance levels while reducing consumption on 3-phase electrical network 118, 218 results in an optimization of the current flow under strict load conditions while controlling the ripple effect on the line. Once the improvement has been made at each electrical circuit of an electrical network 118, 218, this technology will push all of the 60 hertz inefficiencies into the harmonic levels, clearing out unwanted waste at 60 hertz. Then, a harmonic filter with adjustable load capabilities is used to push out the total harmonic distortion (i.e. noise and waste) from the electrical network 118, 218 resulting in reduced overall consumption in the electrical network 118, 218.

As a result of the disclosed system, reduced reactive power levels are possible, reduced kVA consumption, stabilize voltage and increased efficient use of electricity are possible, resulting in a measurable lowering of the overall demand for electricity and increased operational efficiencies of all inductive loads. As a result, commercial and industrial users save money, reduce $CO_2$ emissions and benefit from the extended useful life of the inductive equipment used to operate their businesses.

When this technology is used to balance the current and perform power conditioning for inductive motors the current drawn from the power distribution network is typically reduced by 10% or more. This is due to a reduction in the flow of reactive current, 'tuned-out' harmonics, and improved (reduced) resistance levels while incorporating 60 hertz notch frequency tuning to improve the current flow throughout the electrical network 118, 218 of a commercial or industrial facility. It is manifested as a reduction in total harmonic distortion (THD) and the power factor improvement measurements in the distribution network. Traditional power factor correction systems add kVAR, reactive power, to the electrical network 118, 218, while this technology reduces the need for kVAR in a standard electrical network 118, 218. As a result, electric power company demand charges, peak power usage, the average 15-minute kVA use intervals, and/or power factor induced losses are reduced. The reduction of THD can result in significant improvement in the performance of inductive motors but that alone is not enough to control frequency drift and phase shifting on fluctuating current flows during normal operational periods. It is the combination of functionality in my solution that produces the measurable and sustained results.

Blocks of the flowchart 400 support combinations of means for performing the specified functions and combinations of operations for performing the specified functions of an aspect. It will also be understood that one or more blocks of the flowchart 400, and combinations of blocks in the flowchart 400, can be implemented by special purpose hardware-based computer systems which perform the specified functions, or combinations of special purpose hardware and computer instructions. Also, more, fewer or different steps may be provided. Any of these modifications do not deviate from the scope of the disclosure and the novel inventive features presented herein.

Alternatively, the system may comprise other means for performing each of the operations described above. In this regard, according to an example aspect, examples of means for performing operations may comprise, for example, a computer processor and/or a device or circuit for executing instructions or executing an algorithm for processing information as described above. In an aspect, the disclosure may be implemented in a computer system with processors configured to execute instructions for the acts in FIG. 3. Storage in the form of databases located in local, remote or cloud storage locations may be used in conjunction with the disclosed system and method for words, word levels, graphics, audio-visual interaction and other types of data or information that may be used with the disclosed system and method. Computer I/O devices may also be used, such a mouse, stylus, touch pads, touch screens, keyboards, speakers, microphones, headsets or other I/O devices known to one of skill in the art to be used with the disclosed system and method.

It will be understood that each block of the flowcharts and combination of blocks in the flowcharts may be implemented by various means, such as hardware, firmware, processor, circuitry, and/or other communication devices associated with execution of software including one or more computer method and system instructions. For example, one or more of the procedures described above may be embodied by computer method and system instructions. In this regard, the computer method and system instructions which embody the procedures described above may be stored by a memory device of an apparatus employing an aspect of the present disclosure and executed by the processing circuitry. As will be appreciated, any such computer method and system instructions may be loaded onto a computer or other programmable apparatus (for example, hardware) to produce a machine, such that the resulting computer or other programmable apparatus implements the functions specified in the flowchart blocks. These computer method and system instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer method and system instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An electrical current balancing system for connection to an electrical network with a supply power, the system comprising:
    a line/power filter configured to filter and tune the supply power,
    a switch gear booster in communication with a rack system, a load controller and a bi-directional meter, the switch gear booster configured to manage and stabilize voltage of the electrical network and wirelessly control the rack system while increasing power factor levels of the electrical network,
    where the rack system is configured to step up a power factor ratio of the electrical network using the line/power filter,
    where the load controller further comprises a radio control device for managing on and off controls for performance and validation purposes, and
    a gateway in communication with the load controller and configured to collect and pass data collected by the bi-directional meter for transmission to a data server.

2. The system of claim 1, where the line/power filter comprises a first line filter for a 50 Hertz signal and/or a second line filter for a 60 Hertz signal and configured for narrow band tuning the supply power under a load.

3. The system of claim 2, where the line/power filter is configured to push additional electrical waste from the 50 Hertz signal and/or or 60 Hertz signal into harmonic levels of the supply power.

4. The system of claim 2, where the electrical current balancing system services 50 Hertz or 60 Hertz signals at 600 VAC or less.

5. The system of claim 1, where the line/power filter automatically adjust respective filtering capabilities based on a current load of the electrical network and adjust up or down in order to not add additional current load to the electrical network.

6. The system of claim 1, where the switch gear booster is configured to increase power factor levels to 98% and above to reduce the need for additional kVAR.

7. The system of claim 1, where the load controller comprises a 3-phase power quality meter with a wireless data link for collecting real-time data to measure results in real time.

8. The system of claim 1, where the data server is configured to store historical data with real-time EM and V tracking.

9. A method for configuring an electrical network with an electrical current balancing system, the method comprising:
    Identifying each circuit at a main switch gear level of the electrical network,
    tracing a first circuit to enable installation of an electrical current balancing system,
    performing a measurement of a power quality condition of the first circuit while also identifying a type of AC or DC control equipment loads that comprise the first circuit, after installation of a line/power filter in the electrical network, transmitting an AC or DC filter signal upstream for conditioning loads to allow a cleaner delivery of power,
    installing a switch gear booster nearest a main breaker for switch gear of the electrical network,
    installing a rack system, where the rack system is configured to stabilize a main voltage as well as dial up a facility power factor to a highest level for optimum efficiency,
    installing a load controller for wireless on and off control and testing purposes;
    installing a calibrated bi-directional meter for collecting power quality data of the electrical network, and
    turning on the electrical current balancing system.

10. The method of claim 9, further comprising connecting the electrical current balancing system to an independent breaker.

11. The method of claim 9, further comprising communicating and transferring data to a gateway for transmission to a server.

12. The method of claim 9, further comprising applying an adjustable harmonic filter to reduce noise caused by running electrical power through loads which include impedance of the electrical network.

13. The method of claim 12, further comprising sampling and evaluating line impedance conditions at a rate of 20,000 times a second.

14. An electrical current balancing system for connection to an electrical network with a supply power, the system comprising:

a line/power filter configured to filter and tune the supply power, a switch gear booster in communication with a rack system, a load controller and a bi-directional meter, the switch gear booster configured to manage and stabilize voltage of the electrical network and wirelessly control the rack system while increasing power factor levels of the electrical network, where the rack system is configured to step up a power factor ratio of the electrical network using the line/power filter, where the load controller further comprises a radio control device for managing on and off controls for performance and validation purposes, and a voltage shunt device configured to shunt excess voltage when a grid voltage is above a threshold voltage.

15. The electrical current balancing system of claim 14, further comprising a gateway in communication with the load controller and configured to collect and pass data collected by the bi-directional meter for transmission to a data server.

16. The electrical current balancing system of claim 14, where the voltage shunt device comprises a coiled inductive device.

17. The electrical current balancing system of claim 14, where the voltage shunt device comprises a Zener diode.

18. The electrical current balancing system of claim 14, where the threshold voltage is greater than about 480V.

19. The electrical current balancing system of claim 14, where the line/power filter automatically adjust respective filtering capabilities based on a current load of the electrical network and adjust up or down in order to not add additional current load to the electrical network.

20. The electrical current balancing system of claim 14, where the line/power filter comprises a first line filter for a 50 Hertz signal and/or a second line filter for a 60 Hertz signal and configured for narrow band tuning the supply power under a load.

* * * * *